Patented Sept. 23, 1947

2,427,907

UNITED STATES PATENT OFFICE 2,427,907

POLYMERIZATION OF OLEFIN HYDROCARBONS

Heinz Heinemann and William A. La Lande, Jr., Upper Darby, Pa., assignors to Porocel Corporation, Philadelphia, Pa., a corporation of Delaware No Drawing. Application November 7, 1944, Serial No. 562,406

4 Claims. (Cl. 260—683.15)

1

The present invention relates to the polymerization of olefins, and more particularly to the polymerization of isobutylene to liquid hydrocarbons comprising essentially aliphatic polymers suitable for use in the manufacture of motor fuel.

An object of this invention is the polymerization of isobutylene or of gaseous mixtures containing isobutylene in which only the isobutylene is polymerized in the presence of a catalyst comprising activated bauxite to produce polymers boiling for the most part within the gasoline boiling range.

A further object of this invention is the partial polymerization of dehydrated isobutylene, per se, at temperatures between 350° F. and 600° F. in the presence of a catalyst comprising bauxite which has been activated by heating at a temperature between 700° F. and 1800° F., and preferably between 1200° F. and 1800° F. to a residual moisture content of not more than 2% by weight, and preferably 1% or less by weight. The unpolymerized isobutylene resulting from the conversion operation is preferably recycled with fresh isobutylene for further conversion.

A further object of this invention is the selective polymerization of isobutylene in the presence of other gaseous hydrocarbons, including the normal butenes, and butanes, such conversion being carried out in the presence of the bauxite catalyst above mentioned under conditions such that substantially only the isobutylene is polymerized, any other polymers or copolymers being unstable under the conditions employed.

In our copending application Serial Number 562,405, filed November 7, 1944, now United States Patent Number 2,406,081, and entitled "Polymerization of olefin hydrocarbons," we have disclosed a method of polymerizing olefins, particularly isobutylene, and of copolymerizing olefins such as isobutylene with butene-1 or butene-2, using a bauxite catalyst under conditions such that a high degree of conversion to liquid hydrocarbons in a single pass is obtained. At temperatures below 350° F. we have been able to obtain the conversion of isobutylene into a condensible hydrocarbon liquid product, with yields of from 90% to 100% based upon the weight of isobutylene charged.

In accordance with the present invention, we have further found that a temperature between 350° F. and 450° F., a sharp decrease in yield of isobutylene polymer product in single pass operation occurs. Furthermore, we have found that at temperatures above about 350° F., the copolymerization of isobutylene with the normal butylenes, as well as the homopolymerization of the normal butylenes, is not accomplished to any substantial degree. In fact, the most efficient copolymerization of isobutylene with the normal butylenes, and homopolymerization of the normal butylenes, appears to take place in the presence

2 of bauxite catalyst at temperatures below 350° F., for example, at temperatures of 150° F. to 300° F. It appears that at temperatures above about 350° F., the isobutylene homopolymers tend to depolymerize to a considerable extent, therefore in the single pass conversion of isobutylene a high yield cannot be obtained. Likewise, at temperatures above about 350° F. the copolymers of isobutylene and butene-1 or butene-2, as well as the normal butene polymers, are unstable, and little or no yield can be obtained. Therefore, at temperatures above 350° F. and below actual cracking temperature, i. e., about 600° F., we may obtain two results in the practice of our invention, namely, the catalytic polymerization of isobutylene, per se, to give only a partial conversion per pass, with recycling of unconverted isobutylene, and the catalytic selective polymerization of isobutylene in a gaseous mixture containing substantial amounts of isobutylene. In other words, at temperatures between 350° F. and 600° F., the polymerization of isobutylene is selective regardless of the presence of other hydrocarbon gases, and while the yield of conversion products per pass is considerably less than the optimum, the ultimate yield with recycling of unconverted gas is high. Temperatures above about 600° F. are to be avoided, since cracking becomes appreciable with the resulting undesirable conversion of isobutylene or normal butene into lower molecular weight gases of less value, and the fouling of the catalyst with carbonaceous materials, thus requiring more frequent regeneration.

The present invention therefore comprises contacting isobutylene or a gaseous hydrocarbon mixture containing isobutylene with bauxite at a temperature between 350° F. and 600° F. for a period of time sufficient to obtain partial or selective polymerization of the isobutylene, with the production of liquid hydrocarbons comprising for the most part aliphatic polymers boiling within the gasoline boiling range or having an assay distillation end point not substantially above 400° F., the bauxite having been activated by heating at temperatures between 700° F. and 1800° F., and preferably between 1200° F. and 1800° F. to a residual moisture or volatile matter content (V. M.) of less than 6%, and preferably less than 2%. The unconverted gas from the initial polymerization operation, after separation from the polymer liquid, is preferably recycled for further conversion under similar temperature conditions. This gas containing substantial amounts of isobutylene may be recycled for admixture with fresh charge gas, or may be separately treated in one or more auxiliary units under the aforesaid temperature conditions in the presence of the bauxite catalyst. The pressures employed in the partial or selective polymerization may range from atmospheric pressure up to 2,000 pounds per square inch, atmospheric or slightly superatmospheric pressures being preferred in order to avoid the formation of high boiling polymers. The bauxite may be employed in the form of granular particles or pellets of desired size, or may be utilized in finely divided condition wherein it is suspended or dispersed in the olefins during the conversion reaction and is removed from the reaction product upon completion of the reaction. It is preferred, however, to utilize the bauxite in the form of granules disposed as a bed through which the olefins may be passed in order to effect polymerization, which bed may be heated or cooled as required to maintain it at the desired conversion temperature. When after prolonged use, the polymerizing efficiency of the bauxite has decreased to a commercially uneconomical level, the bauxite may be regenerated by various methods, the most simple and inexpensive of which is heating in the presence of air. In lieu of thermal regeneration per se, the spent bauxite may be treated with steam or solvents and thereafter subjected to heating at temperatures up to 1800° F. The regeneration usually accomplishes complete reactivation of the bauxite to 100% of its original efficiency.

In carrying out the polymerization, the space velocity (volume of gas per volume of catalyst per hour) employed is not particularly important, since within certain limits a high degree of conversion is obtained regardless of the space velocity. In the polymerization of isobutylene, for example, at 450° F. in the presence of bauxite catalyst, 50% conversion of the isobutylene to liquid hydrocarbons is obtained with space velocities up to 375 volumes of gaseous isobutylene per volume of bauxite per hour. With increase in space velocity above 375 the percent conversion decreases progressively.

Our invention may be further illustrated by the following examples, which, however, are not to be construed as limiting the scope thereof.

1. Isobutylene of 95% purity was passed at a rate of 43 liters per hour through 200 gram beds of granular bauxite, one of which had been activated by heating at 700° F. and the other at 1200° F., the polymerization reactions being carried out at various temperatures to obtain liquid hydrocarbon products. The length of time of each run was two hours, and the results obtained are shown in the following table, the yields being expressed in weight percent of isobutylene charged.

| Reaction Tempt. ° F. | Per cent Conversion; Bauxite activated at— | |
|---|---|---|
| | 700° F., 6.0% V. M. | 1200° F., 1.3% V. M. |
| 350 | | 91 |
| 450 | 60 | 50 |
| 600 | 45 | 34 |
| 800 | | 22 |

From the above data it will be seen that a 91% conversion was obtained with bauxite activated at 1200° F. and used at a polymerization reaction temperature of 350° F. However, at 450° F. the polymerization yield had decreased sharply to a value of 50%, and at 600° F. to 34%. These yields, being on a once through basis, are markedly improved by recycling the off gas, so that the second pass at 450° F. gave an additional 25% of liquid polymers, and the third pass at 450° F. gave about 12%, so that the ultimate yield with recycling (three passes) was approximately 87%. While a yield of 22% was obtained in one pass at 800° F., the amount of cracking and the fouling of the catalyst was too great to make operation at this temperature level of any practical interest.

2. A mixture consisting of 75 grams of butene-1 and 75 grams of isobutylene of 95% purity was made up, and the vaporous mixture was passed through a 200 gram bed of 6–14 mesh bauxite which had been activated at 1200° F. to a residual moisture content of 1.18% by weight. The gaseous mixture was passed through the catalyst bed at a rate of 66 liters per hour at atmospheric pressure for a period of 2 hours, the polymerization reaction temperature being maintained at 450° F. During the first hour of operation there was obtained a yield of 34.9 grams of liquid polymers, and during the second hour a yield of 33.6 grams, the polymer product comprising for the most part diisobutylene and a minor amount of tri-isobutylene. The unconverted or "off" gas from the 2 hour run was analyzed and found to consist of 33.3% of isobutylene, 61.4% of n-butenes, 2.0% of propylene, the remaining 3.3% comprising ethane, ethylene, propane, the butanes, pentene, hexene, and heptene. From the analysis of the liquid product and of the off gas, it is evident that at 450° F. the polymerization was selective as to isobutylene, substantially no copolymers of isobutylene and butene-1, or homopolymers of butene-1 having been formed.

3. A mixture consisting of 100 grams of butene-1 and 100 grams of isobutylene of 95% purity was made up, and the vaporous mixture was passed through a 200 gram bed of 6–14 mesh bauxite which had been activated at 1200° F. to a residual moisture content of 1.18% by weight. The gaseous mixture was passed through the catalyst bed at a rate of 43 liters per hour at atmospheric pressure for a period of 1 hour, the polymerization reaction temperature being maintained at 600° F., There was obtained a yield of 23.6 grams of liquid polymers comprising essentially diisobutylene and tri-isobutylene, the formation of copolymers of isobutylene and butene-1, or of homopolymers of butene-1 being negligible at 600° F.

Characteristic boiling data of the stabilized product produced according to the present invention are shown in the following table. While most of the product is suitable for hydrogenation to an aviation gasoline blending stock, the small high boiling end may be depolymerized over bauxite, fuller's earth, or the like at elevated temperatures above about 800° F. and recycled to the polymerization operation.

| | |
|---|---|
| Initial boiling point ° F | 180 |
| 10% | 213 |
| 30% | 221 |
| 50% | 226 |
| 70% | 233 |
| 80% | 241 |
| 90% | 288 |
| End point | 370 |
| Percent Dist | 97 |
| Percent Res | 2 |
| Spec. gravity | 0.7335 |

Our invention is particularly adapted to the treatment of gaseous hydrocarbon mixtures containing substantial amounts of isobutylene, whereby we can obtain selective polymerization of the isobutylene despite the presence of other hydrocarbons including olefins. Our process therefore makes possible the production of relatively pure isobutylene polymers which may be separated from the unconverted gases, and such polymers may be hydrogenated for the production of high octane components for motor fuel, or may be depolymerized thermally or catalytically for the production of relatively pure isobutylene. On the other hand, it is possible by our process to obtain from a mixture of isobutylene and n-butenes, substantially pure isobutylene polymers as one product and n-butenes having a substantially reduced content of isobutylene as the other product, such n-butenes being especially valuable in the production of motor fuel by alkylation methods involving the reaction between isobutane and the n-butenes.

We claim:

1. The method of polymerizing isobutylene to liquid hydrocarbons, which comprises contacting said isobutylene at a temperature between 350° F. and 600° F. with bauxite which has been activated by heating at a temperature between 700° F. and 1800° F. to a residual moisture content of not more than 6% by weight.

2. The method of polymerizing isobutylene to liquid hydrocarbons, which comprises contacting said isobutylene at a temperature between 350° F. and 600° F. with bauxite which has been activated by heating at a temperature between 1200° F. and 1800° F. to a residual moisture content of not more than 2% by weight and separating the isobutylene polymers from unconverted isobutylene.

3. The method of selectively polymerizing isobutylene in the presence of normal butylene to liquid hydrocarbons, which comprises contacting a mixture containing isobutylene and normal butylene at a temperature between 350° F. and 600° F. with bauxite which has been activated by heating at a temperature between 700° F. and 1800° F. to a residual moisture content of not more than 6% by weight, and separating the isobutylene polymers from the unconverted gas.

4. The method of selectively polymerizing isobutylene in the presence of normal butylene to liquid hydrocarbons, which comprises contacting a mixture containing isobutylene and normal butylene at a temperature between 350° F. and 600° F. with bauxite which has been activated by heating at a temperature between 1200° F. and 1800° F. to a residual moisture content of not more than 2% by weight, and separating the isobutylene polymers from unconverted gas.

HEINZ HEINEMANN.
WILLIAM A. LA LANDE, JR.

REFERENCES CITED

The following references are of record in the file of this patent:

UNITED STATES PATENTS

| Number | Name | Date |
| --- | --- | --- |
| 2,198,937 | Frey | Apr. 30, 1940 |
| 2,328,846 | Pitzer | Sept. 7, 1943 |
| 2,353,552 | Drennan | July 11, 1944 |

OTHER REFERENCES

Frost et al., article in Compt. Rend. Acad. Sci.; U. R. S. (N. S.), vol. 4 (1936), pages 373 to 376, 260–683.2.

Ipatieff, "Cat. Reactions at High Press. and Temps."; Macmillan (1936), pages 576 to 577. (Copy in Division 31.)

"Polymerization of Unsaturated Gaseous Hydrocarbons," by Rafael Fussteig, Petroleum Engineer, Aug. 1939, pages 76, 78, 80 and 82.